UNITED STATES PATENT OFFICE.

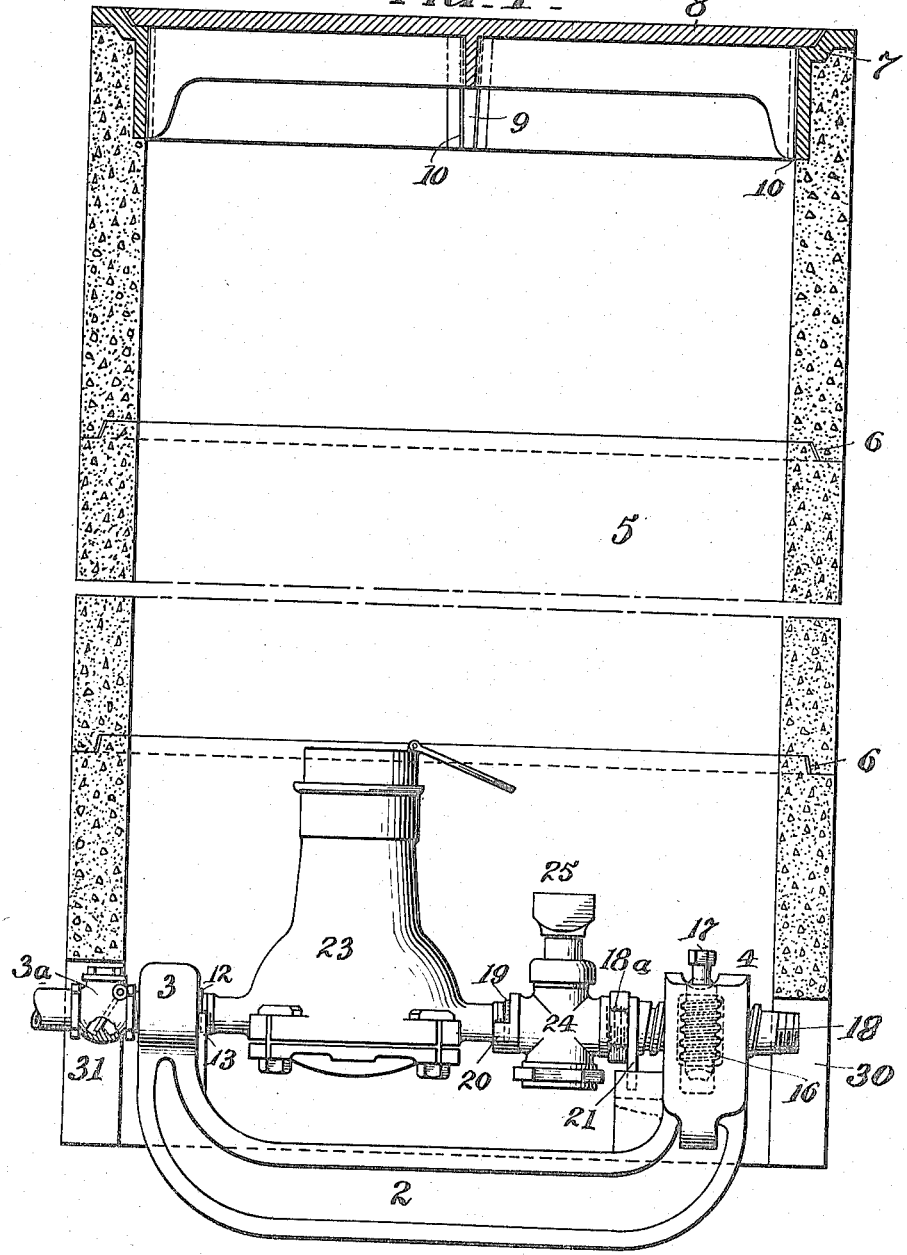

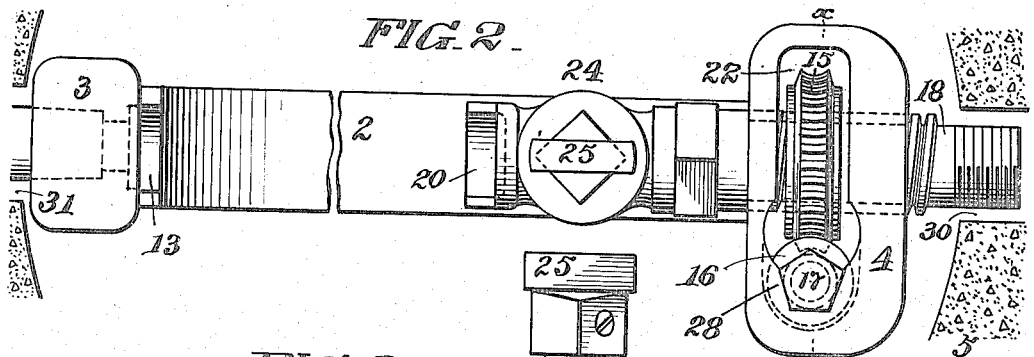
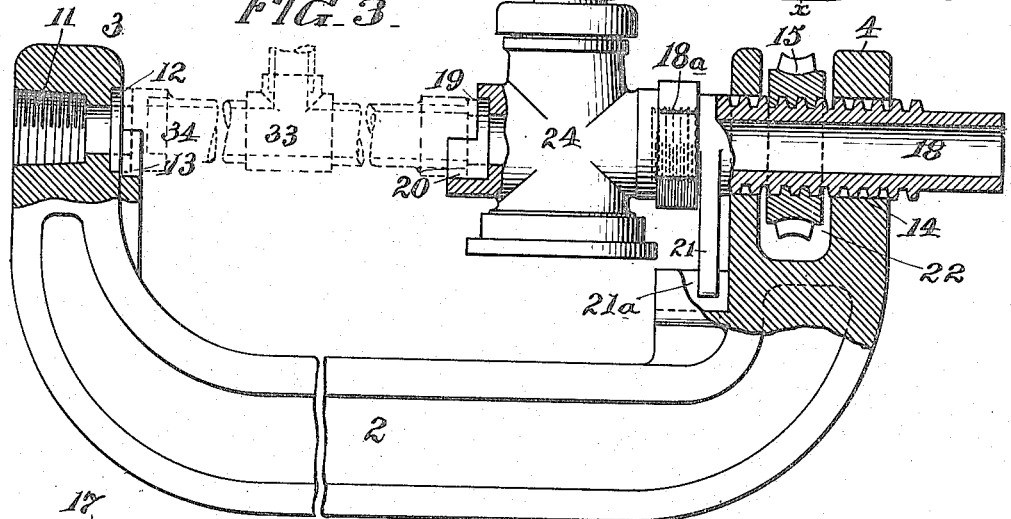
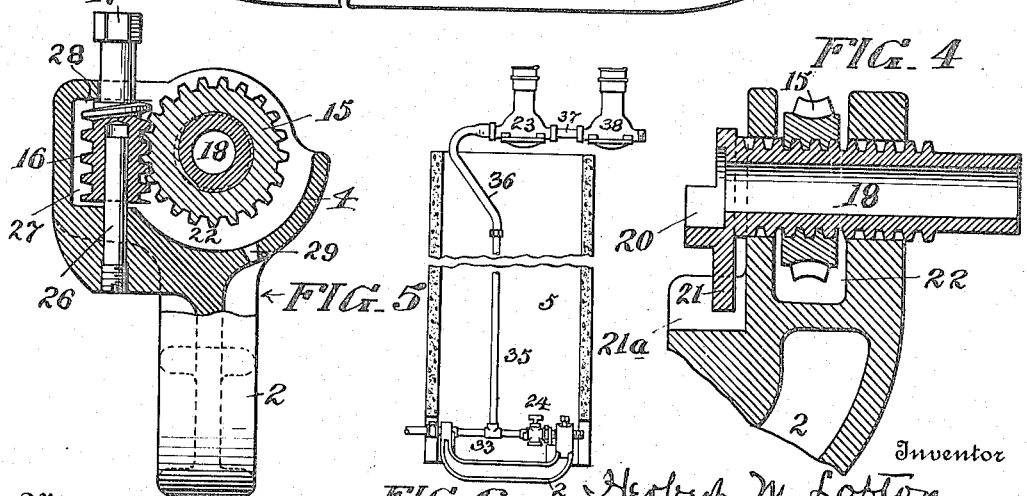

HERBERT M. LOFTON, OF CHATTANOOGA, TENNESSEE.

METER-BOX.

1,133,386.   Specification of Letters Patent.   Patented Mar. 30, 1915.

Application filed May 25, 1914. Serial No. 840,690.

*To all whom it may concern:*

Be it known that I, HERBERT M. LOFTON, citizen of the United States, and resident of Chattanooga, county of Hamilton, and State of Tennessee, have invented an Improvement in Meter-Boxes, of which the following is a specification.

The object of my invention is to provide a construction of meter box for street purposes which shall embody simplicity, adjustability and cheapness. More particularly, I provide a simple yoke frame for supporting the meter and providing detachable connection between the meter and the street and house mains, said features being inclosed or covered by a meter box proper. The meter box proper is preferably of concrete, with a removable cover at the top and a vertically slotted lower edge to straddle the street and house mains and permit vertical adjustment relatively to the meter and yoke structure to suit the variable heights of the pavements above the mains.

The object of my invention is also to so provide the meter box with means for ready connection with the meter or with test piping by which the meter to be inserted in the box may be tested in connection with a test meter to determine its reliability as to proper registration of the water passing through it.

My invention consists of features of construction which are fully set out hereinafter and more particularly defined in the claims.

My invention will be better understood by reference to the drawings, in which:

Figure 1 is a sectional elevation of a meter box embodying my invention; Fig. 2 is a plan view of the yoke and attached devices (with the meter removed) and part of the box structure in section; Fig. 3 is a side elevation of the yoke and attached devices with part in section; Fig. 4 is a longitudinal section of a portion of the yoke, tubular inlet and worm wheel; Fig. 5 is a cross section of Fig. 2 on line *x*—*x*; and Fig. 6 is a sectional elevation of my improved meter box with the meter lifted out and coupled in connection with a test meter and a pipe connection attached to the meter box.

2 is the metal yoke containing the supporting means for the meter 23, and providing terminals for connection with the street and house mains.

5 is the meter box which is arranged above and supported upon the ground around the yoke 2, and said meter box preferably consists of tubular concrete annular sections which interlock at 6 to form the desired height above the yoke to reach to the level of the pavement. The interlocking portions 6 centralize one portion upon the other, so that the tubular interiors are in alinement, and the upper section is built around and in rigid adherence to the cap bushing 7. This cap bushing is provided with a plurality of vertical grooves 10 in its interior side walls, the said grooves being preferably arranged in pairs diametrically opposite each other. The upper part of the cap bushing extends radially over the concrete, so as to fully protect the same and provide an annular recess for receiving the cover plate 8. This cover plate 8 is flanged on its under side, and said flanges are extended downward as at 9 and fit into the vertical grooves 10 of the bushing. By means of this construction, and more particularly in respect to the deep flanges 9 and the great vertical length of the grooves 10, in which the flanges fit, it will be evident that the cover plate cannot be tilted upward and thereby be displaced from its position, as would be the case if there were no deep flanges 9 employed. By the construction here shown, it will be essential in removing the cover plate to bodily lift it vertically for a considerable distance, that is a distance approximately equal to the depth of the flanges 9, because these flanges are locked in the grooves whenever an attempt is made to tilt the cover plate. Because of this necessity of great vertical lifting of the cover plate to remove it for providing access to the meter box, it is evident that no one without the proper tools will be able to remove the cover to tamper with the meter. This construction obviates the necessity of special locking devices. By employing the cap bushing or metal over the top of the concrete box and thoroughly embedding the same therein to rigidly secure the said cap bushing to the concrete, not only is the concrete thoroughly protected and strengthened at the top, but a clean metallic boundary is provided for the cover plate, and against which the cement or other paving may be built to give a desirable surface appearance.

The box 5 will vary in height according to the distance that the water mains are below the surface of the street, and for convenience in building the meter box and for providing a proper depth thereto, I form the box in a plurality of sections with interlocking joints, as shown.

The lower part of the bottom section of the concrete box 5 is provided with vertically notched portions 30 and 31 to fit over the inlet and outlet pipes corresponding to the street and house mains, said slotted portions permitting of vertical adjustment of the box structure relatively to the meter and connections to suit the level of the pavement.

The meter box is shown as circular, but may be made of any other cross section. This difference in shapes, however, is immaterial to my invention, as otherwise the details of construction are similar and the parts coöperate in the same manner.

The concrete box 5 rests directly upon the ground and surrounds the meter and its connections but without putting material pressure upon them. For this reason, the yoke 2 is made without flanges or other connecting parts for receiving the box and confines its function to the maintenance of the connections of the street and house mains with the meter. This yoke 2 is of cast metal in rigid form, having a horizontal body, resting upon or in the ground and provided with upright ends 3 and 4. The end 3 has a threaded socket 11 for receiving the check valve 3ª to which the house main is connected. The aperture of said socket opening inward is provided with an annular recess having a packing bushing 12 and a socket or lug 13 about its lower portion for receiving the outlet or discharge spud of the meter 23.

The end 4 of the yoke is provided with a worm wheel chamber 22 and worm chamber 27, said chambers having a drainage aperture 29 through which any collections of water may discharge. This end 4 is provided with a horizontal guide aperture 14 in which the screw threaded tubular inlet 18 is adjustably guided. The worm wheel 15 is screwed upon the tubular inlet 18 and rotates in the chamber 22 to adjust the tubular inlet longitudinally. The worm wheel is driven by a worm 16 in the chamber 27, said worm having an upwardly extending shank 17 adapted to receive the key for rotating it. The worm 16 is held in axial position by a pin 26 extending up through the part 4 and detachably screwed therein, and by having the upper shoulder of the worm held under the flange 28. In this way, a simple and durable construction for journaling the worm is provided. The tubular inlet 18 is provided on its inner end with a screw-threaded nipple 18ª and a downwardly extending arm 21, the latter guided in the grooved portion 21ª of the yoke to hold the tubular inlet against rotating; and other suitable means for this purpose may be employed.

In the construction shown in Fig. 3, the tubular inlet 18, instead of being provided with the shoulder 20 and the bushing 19, is screwed into a shut-off cock 24 at 18ª, which on its outlet side is provided with the said bushing 19 and the supporting socket or shoulder 20 for the inlet spud of the meter 23. This shut-off cock 24 is of a special construction, provided, as it is, with the supporting and coupling means with the meter, on one end, and having the socket portion 18ª on the other end for receiving the end of the tubular inlet portion 18. The shut-off cock 24 may be operated by the handle 25 by the employment of a key which may be extended down from the street and engaging its handle 25; and it is evident that the same key may be employed also for operating the worm 16.

The shut-off cock 24 is most desirable, in that it permits the street main to be shut off at the meter when removing the latter, but in those cases where the meters are so situated as not to necessitate the use of such a device, the annular recess and bushing and the shouldered socket 20 may be formed directly upon the tubular inlet 18 as shown in Fig. 4.

In connection with my improved meter box, I provide means for testing the meter from time to time, and said means when connected for testing, is as shown in Figs. 3 and 6. This testing device comprises an angle pipe structure, the horizontal pipe 33 of which is closed at one end 34 and open at the other end and in length is approximately equal to the distance between the inlet and outlet ports of the meter, the open end of this being adjusted in communication with the packing ring 19 of the inlet to the meter box and the closed end abutting against the packing of the outlet of the meter box. By rotating the worm, said horizontal pipe may be clamped in position in place of the meter (Figs. 3 and 6) and is adapted to receive the water from the street main by opening the valve 24. The pipe 33 is provided with an upright tubular branch 35 which is connected with a piece of hose 36 extending above the top of the open meter box. The free end of the hose 36 is joined to the inlet side of the meter 23, which for testing has been lifted to the street where it can be observed. The outlet side of the meter is connected by a coupling 37 with the inlet side of a test meter 38. The water is permitted to flow through the pipe 33, pipe 35, hose 36 and thence through the meters 23 and 38 successively. If the meter 23 is accurate, it should register exactly the same amount of water as is registered by the test meter 38. In this manner, the meter of the meter box may be temporarily removed and tested from time to time and the particular mechanism within the meter box which is employed to clamp the meter in place, may also be employed to clamp the testing apparatus in place, as above described.

I have shown my improvements in the form which I prefer in practice, but I do not limit myself to the minor details, as these may be modified without departing from the spirit of the invention.

Having now described my invention, what I claim as new and desire to secure by Letters Patent, is:—

1. In a meter box, a lower portion having at one side an outlet port for the passage of water, combined with a longitudinally adjustable inlet tubular part at the opposite side of the meter box and constituting the other water port thereof and provided with a shut-off valve movable bodily with it toward or from the outlet port, means to hold the valve in an upright position and its body against rotation at all times during its longitudinal movement, and means to adjust the inlet tubular part and valve to or from the outlet port, whereby a meter or testing tube may be clamped between the water outlet port and the longitudinally adjustable inlet tubular part.

2. In a meter box, a lower portion having at one side an outlet port for the passage of water provided with a supporting bearing to receive a meter or testing tube on the inside of the box, combined with a longitudinally adjustable inlet tubular part at the opposite side of the meter box and constituting the other water port thereof and provided with a shut-off valve movable bodily with it toward or from the outlet port and further provided on its inner end with a supporting bearing to receive a meter or testing tube, annular packing around the outlet water port on the inside of the box, annular packing on the inner end of the longitudinally adjustable tubular part, means to hold the valve in an upright position and its body against rotation at all times during its longitudinal movement, and means to adjust the inlet tubular part and valve to or from the outlet port, whereby a meter or testing tube may be clamped between the outlet port and the longitudinally adjustable part.

3. In a meter box, a lower portion having at one side an outlet port for the passage of water, combined with a longitudinally adjustable inlet tubular part at the opposite side of the meter box and constituting the other water port thereof and said inlet tubular part provided with a shut-off valve movable bodily with it, means to hold the valve in an upright position and its body against rotation at all times during its longitudinal movement, and means to adjust the inlet tubular part and valve to or from the outlet port consisting of gearing comprising a worm wheel carried by the meter box and having a screw threaded connection with the longitudinally adjustable inlet part, and a worm carried by the meter box engaging the worm wheel for rotating it, whereby a meter or testing tube may be clamped between the outlet port and the longitudinally adjustable inlet tubular part.

4. In a meter box, the combination of inlet and outlet portions for the water between which a meter may be clamped, said portions being adjustable relatively to or from each other, one of said portions being made longitudinally movable and having a shut-off valve movable bodily with it, combined with means for imparting a relative adjustment to said inlet and outlet portions together with the valve, and means to hold the valve in an upright position and its body against rotation at all times during its longitudinal movement.

5. In a meter box, the combination of inlet and outlet portions for the water between which a meter may be clamped, one of said portions being adjustable relatively to or from the other and having a shut-off valve movable bodily with it, combined with means for imparting a relative adjustment to said adjustable portion and its valve, and a check valve in the other of said portions closing inwardly toward the shut-off valve.

6. In a meter box, an outlet tubular portion having a check valve and an inlet tubular portion having a shut-off valve, adapted to clamp a meter testing tube between the inner ends of said tubular portions within the box, and means for relatively adjusting the said tubular portions and shut-off valve to clamp the meter testing tube in position between them.

7. In a meter box, an inlet part and an outlet tubular part for passage of the water, said parts being provided on their inner ends within the meter box with packing washers adapted to be clamped upon the meter ports or upon a meter testing tube and one of said parts being provided with a check-valve and the other with a shut-off valve, combined with means for providing a relative adjustment of the inlet and outlet tubular parts and their respective valves to or from each other.

8. A meter box, having its lower portion at one side provided with an aperture, combined with a longitudinally adjustable tubular part extending through the aperture, and means to longitudinally adjust the tubular part, said means consisting of a worm wheel 15 screwed upon the inlet tubular part, a worm 16 housed in the lower portion of the meter box and having a polygonal top for rotating it, and a stud independent of the worm extending through the bottom of the meter box and into the worm for providing a journal upon which to rotate and also for positioning the worm.

9. In a meter box, a base portion having inlet and outlet portions opening to the inside of the meter box and provided with packing, an upwardly extending tubular box structure extending upwardly from the base portion, and a detachable tubular structure having a horizontal member 33 closed at one end and open at the other and adapted to be clamped between the packing of the inlet and outlet port portions of the meter box and having an upwardly extending member 35 leading to the upper part of the meter box and adapted for connection with the meter at the upper part of the meter box for testing the meter.

10. In a meter box structure, a yoke in U shape having one of its ends provided with an outlet and the other of its ends with a tubular guide, combined with a longitudinally adjustable tubular inlet, means carried by the yoke to adjust the tubular inlet longitudinally and a meter detachably clamped between the tubular inlet and the outlet and supported by the yoke, and a box structure extending over the meter and yoke.

11. In a meter box structure, a yoke in U shape having one of its ends provided with an outlet and the other of its ends with a tubular guide, combined with a longitudinally adjustable tubular inlet, means carried by the yoke to adjust the tubular inlet longitudinally, a meter detachably clamped between the tubular inlet and the outlet and supported by the yoke, and a box structure extending over the meter and yoke and relatively adjustable thereto in a vertical direction.

12. In a meter box structure, a yoke in U shape having one of its ends provided with an outlet having a shoulder and bushing and the other of its ends with a tubular guide, combined with a longitudinally adjustable tubular inlet also having a shoulder and bushing, means carried by the yoke to adjust the tubular inlet longitudinally, a meter detachably clamped between the bushings of the tubular inlet and the outlet and supported by the yoke through the shoulders of said parts, and a box structure extending over the meter and yoke and having slotted portions at the bottom bridging the inlet and outlet of the yoke.

13. The combination of a meter, with a U shaped yoke in which the meter is supported, said yoke having one of its ends provided with an outlet and a means thereon for receiving the outlet of the meter and the other of its ends provided with a guide aperture, a tubular inlet guided in the guide aperture and having a shut-off cock upon its inner end, said cock provided with means for receiving the inlet of a meter, and means for adjusting the tubular inlet and the shut-off cock relatively toward the outlet on the yoke to clamp the meter in position.

14. The combination of a meter, with a yoke extending under the meter and having upwardly extending ends one of which has provision for connection with a house main and is also provided with a nozzle coupling and support for the outlet of the meter and the other of which ends is provided with a worm and worm wheel chamber and a transverse guide aperture through its walls, a screw threaded tubular inlet for connection with the street main guided in the guide aperture and having attached to its inner end a nozzle coupling and support for the inlet of the meter, a worm wheel in the chamber screwed upon the tubular inlet, and a worm meshing with the worm wheel for rotating it.

15. The combination of a meter, with a yoke extending under the meter and having upwardly extending ends one of which has provision for connection with a house main and is also provided with a nozzle coupling and support for the outlet of the meter and the other of which ends is provided with a worm and worm wheel chamber and a transverse guide aperture through its walls, a screw threaded tubular inlet for connection with the street main guided in the guide aperture and having attached to its inner end a shut-off cock provided with a nozzle coupling and support for the inlet of the meter, a worm wheel in the chamber screwed upon the tubular inlet, and a worm meshing with the worm wheel for rotating it.

16. In a means for coupling a meter with a street main, devices for supporting the meter, combined with an adjustable tubular inlet comprising a shut-off valve portion having on its discharge side an outlet provided with a bushing and a support for the meter and on the inlet side with a tubular extension detachably screwed to the inlet of the shut-off valve.

17. In a meter box structure, a vertical tubular box of concrete reinforced at the top by a metallic rim part and having its lower edge provided with a plurality of vertical slots, combined with a removable cover for the top, and a meter support within the box and having inlet and outlet pipe connections extending through the vertical slotted portions of the lower edge of the concrete box, whereby the box structure is vertically adjustable relatively to the inlet and outlet pipes.

In testimony of which invention, I hereunto set my hand.

HERBERT M. LOFTON.

Witnesses:
  W. J. DODGE,
  L. S. McCULLOHS.